(12) United States Patent
Eskilsson et al.

(10) Patent No.: US 10,313,587 B2
(45) Date of Patent: *Jun. 4, 2019

(54) POWER MANAGEMENT IN AN EYE-TRACKING SYSTEM

(71) Applicant: Tobii AB, Danderyd (SE)

(72) Inventors: Henrik Eskilsson, Danderyd (SE); Mårten Skogö, Danderyd (SE); John Elvesjö, Danderyd (SE); Peter Blixt, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,511

(22) Filed: Dec. 5, 2017

(65) Prior Publication Data

US 2018/0103202 A1 Apr. 12, 2018

Related U.S. Application Data

(63) Continuation of application No. 15/233,761, filed on Aug. 10, 2016, now Pat. No. 9,866,754, which is a
(Continued)

(51) Int. Cl.
*G02B 27/01* (2006.01)
*G06F 3/01* (2006.01)
(Continued)

(52) U.S. Cl.
CPC ..... *H04N 5/23241* (2013.01); *G02B 27/0172* (2013.01); *G06F 3/013* (2013.01);
(Continued)

(58) Field of Classification Search
CPC ........ G02B 2027/0138; G02B 27/0172; G06F 1/32; G06F 3/3218; G06F 3/3231;
(Continued)

(56) References Cited

U.S. PATENT DOCUMENTS 5,835,083 A 11/1998 Nielsen et al.
6,526,159 B1 2/2003 Nickerson
(Continued)

FOREIGN PATENT DOCUMENTS

EP 0687441 A1 12/1995
JP 2009/251658 A 10/2009
(Continued)

OTHER PUBLICATIONS

U.S. Appl. No. 13/283,224, "Final Office Action", dated Feb. 19, 2014, 17 pages.
(Continued)

*Primary Examiner* — Hong Zhou
(74) *Attorney, Agent, or Firm* — Kilpatrick Townsend & Stockton LLP

(57) ABSTRACT

An imaging device adapted to provide eye-tracking data by imaging at least one eye of a viewer, wherein: the imaging device is switchable between at least an active mode and a ready mode; the imaging device is configured, in the active mode, to use active eye illumination, which enables tracking of a corneal reflection, and to provide eye tracking data which include eye position and eye orientation; and the imaging device is configured, in the ready mode, to reduce an illumination intensity from a value the illumination intensity has in the active mode.

24 Claims, 2 Drawing Sheets

Related U.S. Application Data continuation of application No. 14/608,006, filed on Jan. 28, 2015, now Pat. No. 9,442,566, which is a continuation of application No. 13/283,224, filed on Oct. 27, 2011, now Pat. No. 8,976,110.

(51) Int. Cl.
*G06K 9/00* (2006.01)
*H04N 5/232* (2006.01)

(52) U.S. Cl.
CPC ..... *G06K 9/00597* (2013.01); *H04N 5/23245* (2013.01); *G02B 2027/0138* (2013.01); *G09G 2330/021* (2013.01); *G09G 2354/00* (2013.01)

(58) Field of Classification Search
CPC ................ G06F 3/013; G06K 9/00597; G09G 2330/021; G09G 2354/00; H04N 5/23241; H04N 5/23245
See application file for complete search history.

(56) References Cited

U.S. PATENT DOCUMENTS

| | | |
|---|---|---|
| 7,091,471 B2 | 8/2006 | Wenstrand et al. |
| 7,379,560 B2 | 5/2008 | Bradski et al. |
| 7,572,008 B2 | 8/2009 | Elvesjo et al. |
| 8,947,351 B1 | 2/2015 | Noble |
| 8,976,110 B2 | 3/2015 | Eskilsson et al. |
| 9,176,608 B1* | 11/2015 | Baldwin ............... G09G 5/00 |
| 9,442,566 B2 | 9/2016 | Eskilsson et al. |
| 9,866,754 B2 | 1/2018 | Eskilsson et al. |
| 2003/0052903 A1 | 3/2003 | Weast |
| 2003/0179314 A1 | 9/2003 | Nozaki |
| 2004/0073827 A1 | 4/2004 | Tsirkel et al. |
| 2004/0113890 A1 | 6/2004 | Ranta |
| 2004/0130532 A1 | 7/2004 | Gordon et al. |
| 2005/0199783 A1 | 9/2005 | Wenstrand et al. |
| 2005/0289363 A1 | 12/2005 | Tsirkel et al. |
| 2007/0078552 A1* | 4/2007 | Rosenberg ............ G06F 1/1626 700/94 |
| 2007/0122140 A1 | 5/2007 | Ito et al. |
| 2007/0230933 A1 | 10/2007 | Sugimoto et al. |
| 2007/0273611 A1 | 11/2007 | Torch |
| 2008/0111833 A1 | 5/2008 | Thorn et al. |
| 2009/0073128 A1 | 3/2009 | Marsden |
| 2009/0263012 A1 | 10/2009 | Georgis et al. |
| 2010/0053133 A1* | 3/2010 | Furuta ................... G02B 6/002 345/207 |
| 2010/0066975 A1 | 3/2010 | Rehnstrom |
| 2010/0079508 A1 | 4/2010 | Hodge et al. |
| 2011/0013007 A1 | 1/2011 | Holmberg et al. |
| 2011/0134251 A1 | 6/2011 | Kim et al. |
| 2011/0304706 A1 | 12/2011 | Border et al. |
| 2012/0062445 A1 | 3/2012 | Haddick et al. |
| 2012/0272179 A1 | 10/2012 | Stafford |
| 2012/0319972 A1 | 12/2012 | Tse et al. |
| 2013/0083976 A1* | 4/2013 | Ragland ................. G06F 3/011 382/117 |
| 2013/0106681 A1 | 5/2013 | Eskilsson et al. |
| 2014/0002349 A1 | 1/2014 | Hansen |
| 2015/0145769 A1 | 5/2015 | Eskilsson et al. |
| 2016/0314349 A1 | 10/2016 | Eskilsson et al. |
| 2016/0353025 A1 | 12/2016 | Eskilsson et al. |

FOREIGN PATENT DOCUMENTS

| | | |
|---|---|---|
| JP | 2009/301166 A | 12/2009 |
| WO | 2008/056274 A1 | 5/2008 |

OTHER PUBLICATIONS

U.S. Appl. No. 13/283,224, "Non-Final Office Action", dated Oct. 3, 2013, 18 pages.
U.S. Appl. No. 13/283,224, "Non-Final Office Action", dated May 7, 2014, 19 pages.
U.S. Appl. No. 14/608,006, "Non-Final Office Action", dated Aug. 13, 2015, 20 pages.
U.S. Appl. No. 15/233,761, "Non-Final Office Action", dated Jun. 1, 2017, 24 pages.
Guestrin, et al.; "General Theory of Remote Gaze Estimation Using the Pupil Center and Corneal Reflections"; IEEE Transactions on Biomedical Engineering, vol. 53, No. 6, Jun. 2006, pp. 1124-1133.
U.S. Appl. No. 15/202,915, filed Jul. 6, 2016 Non-Final Rejection dated May 3, 2018, all pages.

\* cited by examiner

POWER MANAGEMENT IN AN EYE-TRACKING SYSTEM

CROSS REFERENCE TO RELATED APPLICATION

This application is a continuation of U.S. application Ser. No. 15/233,761 filed on Aug. 10, 2016, which is a continuation of U.S. application Ser. No. 14/608,006 filed on Jan. 28, 2015, now U.S. Pat. No. 9,442,566, which is a continuation of U.S. application Ser. No. 13/283,224 filed on Oct. 27, 2011, now U.S. Pat. No. 8,976,110, all of which are hereby expressly incorporated by reference into the present application.

TECHNICAL FIELD OF THE INVENTION

The invention disclosed herein generally relates to eye tracking (determination of eye position, gaze point or gaze angle) for providing input data to a computer system. In particular, the invention provides an energy-efficient implementation of eye tracking assisted by an artificial light source adapted to determine the gaze point of an eye watching a visual display forming part of a portable or stationary personal computer system, a TV, a heads-up display in a vehicle, a near-eye display or a display in a communication device with imaging and computing capabilities, such as a mobile telephone.

BACKGROUND OF THE INVENTION

Monitoring or tracking eye movements and detecting a person's gaze point can be used in many different contexts. Eye tracking data can be an important information source in analyzing the behavior or consciousness of the person. It can be used both for evaluating the object at which the person is looking and for evaluating the respective person. The diverse uses of gaze point detection include studies on the usability of software and different types of interfaces; evaluation of web pages, advertising and advertisements; provision of means for educating pilots in simulator environments and for training surveillance personnel in security-critical roles; and research in psychology, behavioral sciences and human perception. A field which has attracted an increasing interest in recent years is the evaluation of advertising and other marketing channels.

Eye-tracking techniques can also be used in a human-machine interface (HMI): a user can control a computer by just looking at it. Such eye control can be applied as sole interaction technique or combined with keyboard, mouse, physical buttons and voice. Eye control is used in communication devices for disabled persons and in various industrial and medical applications.

While eye-tracking systems are utilized in a growing range of applications aimed at professionals, they are rarely included as standard peripherals in or as integral parts of new laptops, desktops, smart phones and other personal computer systems. In the case of battery-powered systems, concerns that eye-tracking functionalities might impair an otherwise optimized energy management may be one reason for this absence.

US 2005/199783 A1 describes a technique for switching a generic device between a power-up state, a sleep state and a power-off state on the basis of eye detection data relating to a user. Only the presence or absence of an eye is of concern, not the gaze angle. A detected presence of an eye causes switching from the sleep state to the power-up state, while a detected absence causes switching down from the power-up state to the sleep state, and then to the power-off state of the device. While this document describes how an eye detection result, namely eye presence, can be used to improve the energy performance of the generic device, it does not address the power management problem in the eye detection equipment itself. Nor does it propose any solution that is tailored to, and benefits from, the particularities associated with eye detection activity.

Similarly, U.S. Pat. No. 5,835,083 A and WO 2008/056274 A1 discuss how gaze-point measurements can be used to control a power state of a visual display, so that power consumption is reduced when a user's eyes and hence a user's attention are not directed to the device. They also do not address power management in the eye tracker itself.

SUMMARY OF THE INVENTION

In view of the above concerns, it is an object of the present invention to propose a personal computer system with improved power management functionalities in respect of eye-tracking equipment included therein. It is a particular object to improve power management in a system of this type while preserving low latency in respect of user interactions at all instants when the device is operating. Yet another object is to provide an eye-tracking system that can be integrated in a personal computer system (e.g., desktop or laptop computer, tablet computer, notebook, net book, TV, smart phone, personal digital assistant, digital camera, heads-up display, near-eye display) without burdening the energy performance of the computer system.

At least one of these objects is achieved by a method, computer program product, and personal computer system, as set forth in the independent claims. The dependent claims define embodiments of the invention.

A personal computer system includes a visual display, an imaging device for providing eye-tracking data by imaging a portion of the face (preferably including at least one eye) of a viewer of the visual display, and further one or more input means for accepting eye-tracking control data and other input data. The imaging device may include a camera and an optional light source for illuminating an eye in an on-axis or off-axis fashion, or for producing at least one corneal reflection (or glint, or first Purkinje reflection) to facilitate eye tracking. Such illumination which the imaging device provides in addition to natural or background light sources will be referred to as active illumination. The other input data may include pointing device signals, keyboard characters, keyboard combinations, visual data other than eye-tracking data, proximity sensing, data acquired by an acoustic transducer and the like.

According to a first aspect of the invention, the imaging device is operable in at least an active mode, a ready mode and an idle mode. In the active mode, the imaging device is fully operable as regards accuracy, detection range and other performance parameters that may influence the momentary power consumption of the device. The ready mode and the idle mode represent power-saving alternatives to the active mode, which differ at least with respect to their respective wake-up times. More precisely, the wake-up time required to switch from ready mode into active mode is shorter than the wake-up time required to switch from idle mode into active mode.

The invention achieves at least one of its objects since the proposed energy management technique takes into account the fact that eye-tracking algorithms generally contain recursive filtering (e.g., Kalman filtering), wherein the accuracy is improved gradually with the number of iterations, or are dependent on previous measurements, intermediate data or partially processed data to be used as initial guesses for subsequent tracking. An eye-tracking algorithm of this type does not provide accurate and complete measurement data from the moment it is cold-started, but only after a wake-up time period has elapsed. Hence, in the prior art, the requirements of low energy consumption and responsiveness (low user latency) are clearly conflicting. The invention alleviates this difficulty by proposing a ready mode, in which the eye-tracking equipment operates at lower but non-zero power, so that a portion of the previous measurements, intermediate data or partially processed data remain updated and available to support and facilitate subsequent measurements when the equipment switches back into its active mode.

The active, ready and idle mode may differ regarding the state of (components of) the imaging device only, but may also differ with respect to operational parameters of other components in the personal computer system. For instance, the fact that the imaging device enters its off mode may trigger turn-off of a backlight in the visual display.

The imaging device may consist of a camera only, preferably a digital camera, but may also include further components, such as a light source for assisting the camera, e.g., by emitting non-visible light pulses preferably in the infra-red or near-infrared range. Within the imaging device, therefore, either the camera only, the light source only or a combination of these and possible further components may behave differently in the active, ready and idle mode, respectively. As used herein, the term imaging device is not restricted to optical cameras, but is also intended to cover acoustic (e.g., ultrasound), electromagnetic (e.g., radar) sensors. The term also extends beyond those sensors which produce images that are perceived as such by a human viewer, thereby covering sensors formed as arrangements of a single-digit number of pixels, sensors including highly distorting pre-lenses intended to favor optical accuracy in regions of interest over other regions etc. Furthermore, the imaging device may be directed towards one or more of the viewer's eyes only but may as well image a larger portion of the face so as to determine a relative head pose, and the gaze may be determined based on the position of at least one eye in the face.

The active and ready modes may differ with regard to the data the imaging device provides. In the active mode, both eye position and eye orientation may be provided. (To make this statement precise, the imaging device may output processed data representing eye position and eye orientation or, if it lacks appropriate processing capabilities of its own, the imaging device may output sufficient raw image data that a processor is able to determine eye position and eye orientation. The receiver of the output data may be a processor responsible for executing a graphical user interface forming part of application software, a desktop environment or the like.) In the ready mode, however, either of these may be omitted to save resources, preferably eye orientation so that only eye position is provided. The eye position tracking may proceed throughout the ready mode, though preferably at a lower frame rate than in the active mode, so that up-to-date information on the eye position is readily at hand at the moment the imaging device switches back into active mode. This reduces the wake-up time significantly, while the energy consumption in ready mode may be limited significantly.

Alternatively, the active and ready modes may differ with respect to the number of distinct tracked eye features (e.g., pupil location, corneal reflections) on which the imaging device bases the eye-tracking data. In active mode, the eye tracking may be based on two or more features. For example, the eye-tracking processing may be based on reflections of no less than two distinct light sources (including the case where the reflections are captured within different camera frames), whereas in ready mode, the eye tracking may be based on a single distinct reflection, such as may be obtained using one single light source (including the case where a reflection of this light source is imaged at multiple points in time within different frames), that is, the eye-tracking processing is able to complete based on data from a single reflection. It is recalled that gaze tracking according to the pupil-centre-corneal-reflection (PCCR) approach requires as input the locations of a pupil and a corneal reflection that are simultaneous or near-simultaneous (see, e.g., the paper *General Theory of Remote Gaze Estimation Using the Pupil Center and Corneal Reflections* by E. D. Guestrin and M. Eizenmann, *IEEE Transactions on Biomedical Engineering*, vol. 53, no. 6, pp. 1124-1133 (June 2006), included herein by reference). The camera-to-eye distance may be a further input data source in PCCR gaze tracking. It is described in U.S. Pat. No. 7,572,008 how this distance can be estimated on the basis of two distinct corneal reflections. Accordingly, the eye tracker may refrain from updating the latest estimate of the camera-to-eye distance when in the ready mode but may do so intermittently in the active mode.

Further advantageous examples indicating how the active and ready modes can be configured in detail are noted in Table 1.

TABLE 1

| Mode configurations | |
| --- | --- |
| Active mode | Ready mode |
| The imaging device tracks a pupil location and at least one corneal reflection. | The imaging device tracks a pupil location. |
| The imaging device applies active illumination, which enables tracking of a corneal reflection. | The imaging device does not apply active illumination. |
| One light source and one camera are active. | Two light sources and one camera are active. |
| One light source and one camera are active. | One light source and two cameras are active. |
| One camera is active. | One light source and one camera are active. |
| The imaging device operates at full resolution. | The resolution of the imaging device is reduced by binning pixel groups, e.g., by 2 × 2 (ratio 4:1), 4 × 4 (ratio 16:1), 1 × 2 (ratio 2:1), 2 × 1 (ratio 2:1), wherein multiple pixels are read out as one. Preferably, since binning increases the sensitivity of the imaging device, an associated light source is operated at lower intensity or is turned off completely. Additionally, the exposure time of the imaging device may be increased, thereby further increasing sensitivity at the cost of some accuracy. |
| The imaging device operates at a relatively lower binning ratio, e.g., 2:1. | The imaging device operates at a relatively higher binning ratio, e.g., 16:1. |
| The imaging device measures or estimates an eye position in world coordinates (e.g., n-dimensional coordinates or 3-dimensional coordinates). | The imaging device measures or estimates an eye position in image-plane coordinates (e.g., (n − 1)-dimensional coordinates or 2-dimensional coordinates). |

It is pointed out that the scope of the invention includes combinations of the above pairs as well. Likewise, binning may refer to analogue binning, such as by reading out pixel charges in a group-wise fashion, so that luminous energy received at a plurality of pixels contribute to one value. It may also refer to digital binning in the sensor, which may form part of a pre-processing step involving adding or combining read-out data pixel values in processing hardware.

Moreover, in a system where plural cameras and/or plural light sources are provided, the ready mode may involve using a smaller number of these devices. Since estimations based on a smaller data set may have greater statistical variance, this mode may lead to slower and less accurate eye tracking data but may still provide sufficient information to significantly shorten the time for switching into active mode and collecting relevant eye-tracking data in comparison with a cold start from idle mode.

The input means in the personal computer system may consist of a dedicated input means on the one hand and general-purpose input means on the other. It may also consist only of either of these, as mentioned in the next paragraph. The dedicated input means are used to input eye-tracking control data only, whereas the general input means accept all other input data than eye-tracking data, that is eye-tracking control data and other input data. Because the dedicated input means is used only for eye-tracking control data, the operating system may allocate to it abilities to activate the eye tracker with lower delay than the general-purpose input means would achieve. The dedicated input means may be configured as a camera for detecting predefined face gestures, predefined body gestures or a microphone for detecting a predefined voice pattern. Advantageously, the camera used for this purpose is identical to the at least one imaging device that supplies the eye-tracking data. The dedicated input means may further be embodied as a hardware or software button, an IR sensor, a motion sensor, a proximity sensor, a touch-sensitive layer of a visual display or a portion thereof. In the latter case, one touch-sensitive display may comprise both an area acting as a dedicated input means and an area acting as a general-purpose input means.

Said eye-tracking control data entered via the dedicated input means may be an activation click, that is, a mouse-click-type signal supplementing a gaze point on the visual display to achieve a similar interface as that offered by a conventional pointing device, although this need not be organized on the basis of the pointer location as such conventional systems generally are. A completely hands-free HMI, in which all input data are entered either in the form of eye-tracking data or eye-control data, is envisioned. Additional input means in such hands-free HMI may include acoustic, haptic or optic transducers and the like but is devoid of devices adapted to be mechanically manipulated using fingers, hands or other body parts.

Said eye-tracking control data may also be used to switch the eye-tracking functionalities between an enabled state and a disabled state, which may be particularly attractive for users conscious about personal integrity. As one possible option, the dedicated control means may be configured to force the imaging device into idle mode.

Alternatively, the dedicated input means may trigger an interrupt by which the imaging device is forced into active mode. The triggering may be achieved by functionally connecting the dedicated input means to an interrupt means (e.g., an interrupt pin) provided on the imaging device or on a processor associated therewith. Preferably, the dedicated input means is functionally disconnected from the interrupt means in the active mode, so as not to perturb the work of the imaging device during active mode, wherein the computational load is relatively higher than in other modes. By using an interrupt in this manner, the total latency associated with a switching into the active mode is reduced in comparison with the case of triggering the switching by means of the general-purpose input means, which typically have an inherent latency. Most of today's low-grade and middle-grade keyboards, mice, touch screens and other general-purpose I/O devices, of the type which a user may be expected to connect to a personal computer system in their possession, operate by line scanning followed by interrupt generation. Such an interrupt is generated indirectly, not by the user's actuation but by the scanning result. This principle of operation incurs a delay, which is typically negligible in the intended use of the I/O device (e.g., typing) and therefore rarely improved on by the manufacturer, but which makes a general-purpose I/O device poorly fit to input eye-tracking control data. Indeed, the latency contributed by the I/O device adds to the wake-up time of the imaging device itself, so that the total latency may become larger than is acceptable in a given application. This embodiment of the invention resolves the problem by triggering an interrupt directly.

In a further embodiment, the imaging device is powered separately, such as via an autonomously controllable electric switch connecting it to a drive power necessary for its operation. With this setup, the idle mode may consist in a complete power-off state of the imaging device. Hence, advantageously, the dedicated input means forces the imaging device into idle mode by disconnecting it from said drive power.

The active, ready and idle mode may differ with respect to an operating frequency of the imaging device. Generally, the operating frequency may refer to any frequency characterizing a component within the imaging device, to the extent that the frequency influences the momentary power consumption. In particular, the operating frequency may be the sampling frequency (or frame rate) of a camera within the imaging means. It may also refer to a light-pulse frequency of a pulsed light source used in connection with a camera of this type, wherein each light pulse is synchronized with a sampling instant of the camera. In particular, the active and the ready mode may differ in terms of the operating frequency, wherein the ready mode is associated with a lower, non-zero frequency which maintains eye-tracking at a less accurate level. Such a less accurate level is yet configured with the aim of promoting fast switching from the ready mode into the active mode.

As a further option, which is particularly advantageous in connection with an eye tracker that utilizes active illumination, the operation of the imaging device in ready mode may include reducing an illumination intensity of the light source from the value it has in active mode. The illumination may even be dispensed with altogether, by turning the light source off, wherein the camera may optionally operate with longer exposure duration and/or pixel binning, so that the imaging device still provides output data although at a relatively lower quality. While the illumination is turned off, the duties normally fulfilled by the camera may alternatively be carried out by a camera for non-visible light, such as a camera sensitive to infrared radiation in or around the wavelength range corresponding to human body temperature.

The personal computer system may include a viewer presence detector, which is adapted to produce a positive and/or a negative detection signal causing the imaging device to transfer between modes accordingly. The presence detector may be a proximity detector or motion detector operating on the basis of, e.g., optic, acoustic, electromagnetic or capacitive measurements. It is noted that the presence detection may relate either to proximity of a viewer's eye to the imaging device or to proximity of the viewer's face, head or body to the imaging device or the personal computer system.

It is particularly advantageous to embody the viewer presence detector as a sensor arranged to detect proximity of a viewer's finger (or hand) to a button, scroll wheel or other hardware that is typically used for inputting data during a work session. The proximity sensor may for example be mounted in a push button acting as a dedicated input means in the sense above, notably for entering activation clicks with reference to a visible item appearing at the gaze position on a display. Such an activation click may cause activation of the item in the same manner as a conventional mouse click does. When the viewer has been detected in the above manner as being present, it is ensured that the imaging device enters ready mode, so that a switching to active mode, in case work is resumed, can be performed in very short time. The switching time may be further reduced if this embodiment is used in conjunction with other features of this invention, such as by using a direct interrupt to carry out this mode switching.

Alternatively or additionally, the personal computer may include an identifying means for determining the identity of a current viewer. The identification may be carried out with reference to a set of predefined personal profiles, wherein each is associated with personalized active modes including, e.g., values of parameters relevant to eye-tracking and/or energy management. The values may be pre-set by the viewer or by a system administrator with reference to an existing person. Alternatively, they may be generic in nature and pre-stored by a system designer to suit different categories of users.

As a further development of the preceding embodiment, the identifying means is an imaging device which is capable of sensing a viewer's (or in particular, an identified viewer's) actual viewing condition. By an actual viewing condition is understood the presence of viewing aids, such as eyeglasses or contact lenses, or the wearing of certain garments, such as a cap or a veil, which information may improve or render more economical the acquiring and/or computational processing of eye-tracking data. Such adaptations may include modifying eye illumination, controlling optical filtering or compensating reflections and/or geometrical deformations produced by refractive elements in proximity of the eye. The adaptations may advantageously be encoded as one or more sub-profiles associated with the personalized profiles discussed above. For instance, the active mode of the imaging device may be differentiated into active modes for persons A, B, C, etc., wherein the active modes for person A may be further subdivided into sub-profiles "person A without eyeglasses", "person A wearing clear eyeglasses" and "person A wearing sunglasses".

In a second and third aspect, the invention provides a method for operating a personal computer system including eye-tracking functionalities as well as a computer program product for performing the method by means of a programmable processor communicatively connected to—or constituting—said personal computer system. The above features which have been outlined within the first aspect readily carry over to the second and third aspect, in which they may be used to advantage.

It is noted that the invention relates to all combinations of features, even if they are recited in mutually different claims.

BRIEF DESCRIPTION OF THE DRAWINGS

By way of example and not limitation, embodiments of the invention will now be described with reference to the accompanying drawings, on which.

All the figures are schematic and generally only show parts which are necessary in order to elucidate the invention, whereas other parts may be omitted or merely suggested.

DETAILED DESCRIPTION OF EMBODIMENTS

Figure 1:
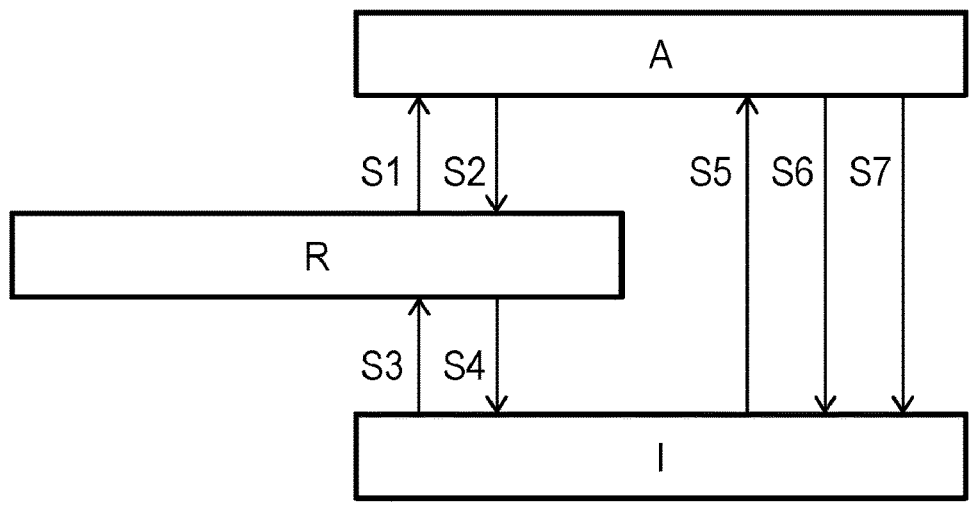
FIG. 1 illustrates an active, ready and idle mode of an eye-tracking equipment and transitions between these.
Figure 3:
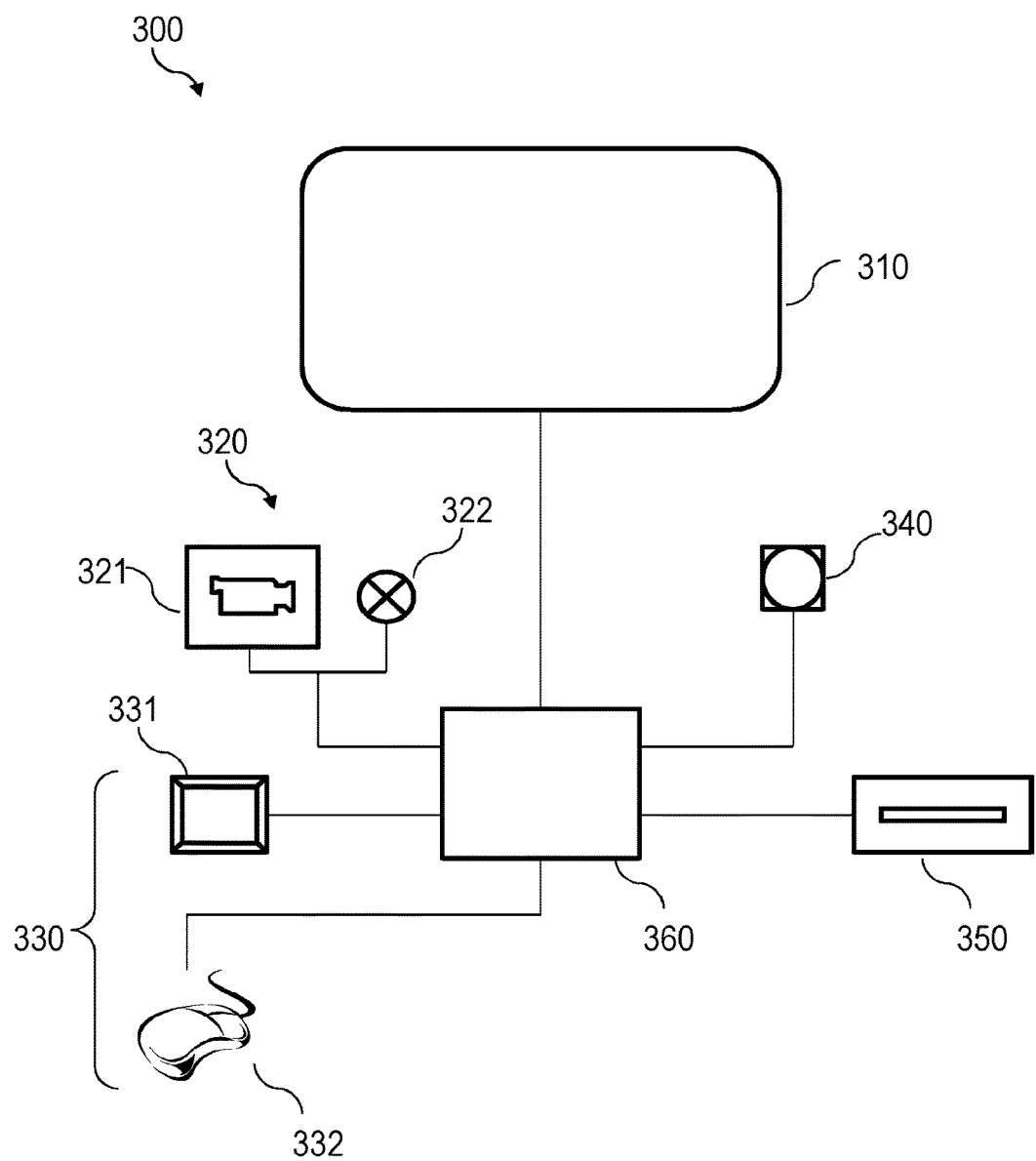
FIG. 3 is a generalized block diagram of a personal computer system in accordance with an embodiment of the invention.

FIG. 1 schematically shows an active mode A, a ready mode R and an idle mode I of a imaging device in an eye tracker. As outlined above, the eye tracker performs computations of a recursive nature or uses historic data, so that, on the one hand, a given computing or measuring task may be facilitated or expedited by results or intermediate results from previous computations and measurements and, on the other hand, the eye tracker has considerable wake-up time before it provides accurate and complete output data. No result history is maintained in the idle mode, whereas a full result history allowing the eye tracker to take full advantage of the previous computations and measurements—is maintained in the active mode. The full result history may refer to a moving time window of values, whereby the least recent values are discarded as new ones are entered. The ready mode is characterized by producing and maintaining a partial result history (e.g., lower sample rate, fewer samples or samples acquired at lower resolution or lower accuracy), representing a trade-off between low energy consumption and high responsiveness (quantified as, e.g., a short wake-up time). Likewise, in implementations where various hardware components are associated with a warm-up or initialization time until the component is in a fully operational state, the ready mode may correspond to a partially operational mode, wherein not all components operate at full power and/or some components are completely disabled. Preferably, the disabled components are those which contribute most significantly to the total power consumption and/or have the shortest initialization time FIG. 3 shows a personal computer system 300, which includes a visual display 310 for displaying output data. The visual display 310 may produce an image acting as a reference for gaze-point detection in a HMI including gaze-based communication; in this case, the gaze point may be determined by intersecting the detected optic axis of an eye with the image plane of the display 310 and correcting for the off-axis position of the fovea in the retina using per se known techniques for this. The personal computer system 300 further comprises an imaging device 320, which in this embodiment comprises one camera 321 and one pulsed light source 322 synchronized with the camera 321. Depending on the intended use conditions, alternative embodiment the imaging device 320 may include more than one camera and more than one light source, but may as well lack a light source altogether. The momentary power of both the camera and the light source varies with operational parameters such as the sampling and illumination pulse frequency, the intensity and solid angle of illumination, the image resolution and image size, so that a power-saving mode, in particular a ready mode or idle mode, may be achieved by modifying one or more of these parameters. The display 310 and the imaging device 320 may be separate free-standing devices as shown on the drawing, or may form one multi-purpose unit. Alternatively, either or both may be embodied as head-mounted devices; this is particularly advantageous in connection with a hands-free HMI of the type outlined above.

The personal computer system 300 further comprises input means 330 including a dedicated input means 331 (symbolically shown as an "off" button) for entering eye-tracking control data and a general-purpose input means 332 (symbolically shown as a mouse). Further, the system 300 includes a presence sensor 340 (shown as an optical sensor) for sensing the presence of a viewer or, possibly, a viewer's eye, as well as an identifying means 350, such as a biometric sensor (shown as a line scanner for fingerprints). In the figure, the peripherals discussed so far are shown connected to a central unit 360, possibly including a processor (not shown), and may be embodied as physically separate components or as integral parts of the central unit 360. In this embodiment, the imaging device 320 supplies its output data to the central unit 360, which is responsible for executing a program (e.g., a desktop environment or application software) providing a user interface with which the user interacts. In portable computers and smart phones, the peripherals are commonly embodied within a common housing.

The configuration that FIG. 3 illustrates relates to a solution with a relatively low degree of hardware integration. A possible alternative hereto may be obtained by utilizing the camera 321 as a presence sensor, so that no dedicated component is required to detect user presence. This may be achieved with negligible inconvenience, since presence detection is most relevant in the idle or ready mode, when the camera 321 is typically operated at reduced frame rate and/or resolution. Also, the identifying means 350 may be integrated in the imaging device 320, e.g., in the form of face recognition iris recognition identifying means.

Further, the viewer presence detector may be embodied as a proximity sensor arranged in a touch input device, such as the mouse 332 or the button 331 in FIG. 3. This makes it possible to predict input of new data and put the eye tracker 320 in ready mode so as to let the delay, which is associated with this mode change, elapse at an earlier point than after the first input data arrive.

It will be appreciated that further integration of several functions into one hardware unit is possible, as is distribution of one functionality over several collaborating hardware units.

As shown in FIG. 1, transitions from any mode to any other mode are enabled. In this embodiment, the mode transitions are triggered by signals provided by the presence sensor 340, a "off" button 331 for entering eye-tracking control data (forcing of the eye-tracking equipment into idle mode) and general-purpose input means 332 for entering input data other than eye-tracking data and eye-tracking control data. The switching between modes may proceed as indicated in Table 2.

TABLE 2

Mode transitions

| | From/To | Trigger condition |
|---|---|---|
| S1 | R→A | The general-purpose input means 332 receive data. |
| S2 | A→R | The general-purpose input means 332 have not been used for a first predetermined time interval. |
| S3 | I→R | The presence sensor 340 detects that a viewer is present. Alternative trigger: the imaging device 320 in low-power mode detects that a viewer is present and his or her approximate gaze direction is at the visual display (wake on gaze). The approximate detection may for instance be configured to detect two pupils that are seen in a direction close to the frontal direction, that is, wherein the pupils are moderately elliptic and do not differ above a given threshold from a circular shape. |
| S4 | R→I | The presence sensor 340 detects that no viewer is present. Alternative trigger: the presence sensor 340 has not detected presence of a viewer for a second predetermined time interval. |
| S5 | I→A | The general-purpose input means 332 receive data. Alternative trigger: wake on gaze, as detailed above, optionally supplemented by requiring that a dedicated input means receive data. |
| S6 | A→I | The presence sensor 340 detects that no viewer is present; alternatively, the presence sensor 340 has not detected presence of a viewer for a second predetermined time interval. |
| S7 | A→I | The "off" button 331 is activated. |

This embodiment achieves an object of the invention since transition S1, the resulting wake-up time of the system, requires less time than transition S5.

The exemplifying embodiment shown in FIG. 3 lacks a positive dedicated input means. It will be appreciated that such positive dedicated input means may be readily included, for instance, as a hardware button for inputting eye-tracking control data. The eye-tracking control data may be input by depressing the hardware button. As explained earlier, the pressing functionality of the button may alternatively be reserved for input of other input data that are not related to eye tracking, wherein the eye-tracking control data are entered by a proximity sensor arranged within the button. Clearly, such positive dedicated input means may in some embodiments replace the "off" button 331 shown in FIG. 3.

Figure 2:
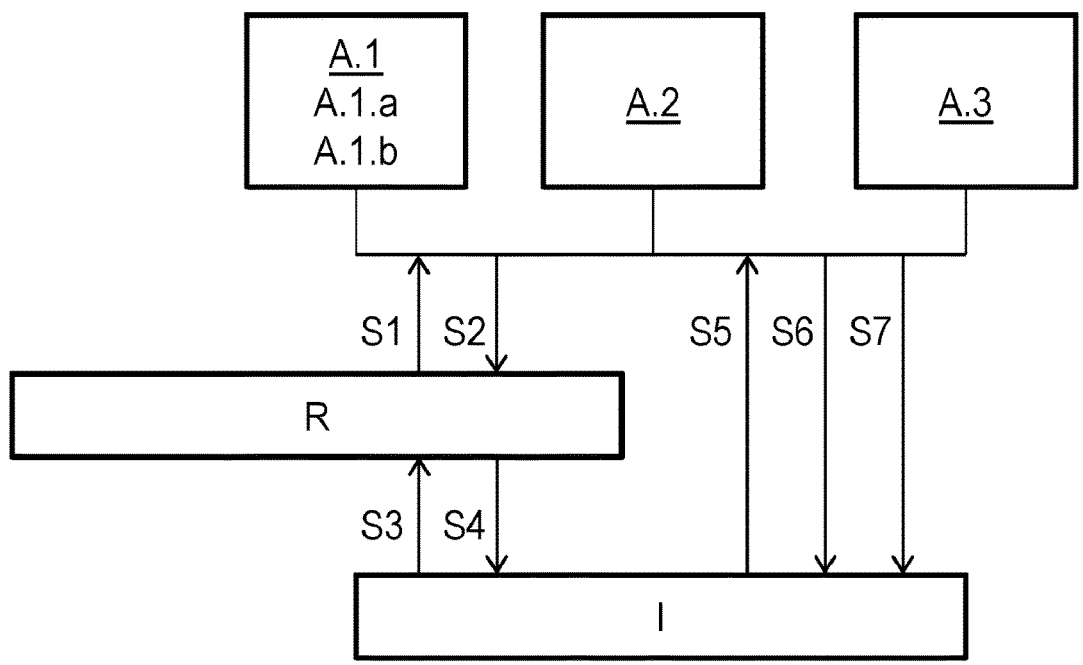
FIG. 2 illustrates a further development of the setup in FIG. 1, wherein the active mode is differentiated into personalized modes.

Turning to FIG. 2, it will not be discussed how the above setup can be further developed by differentiating the active mode A into a set of personalized active sub-modes A.1, A.2, A.3, each associated with a known viewer. This embodiment includes an initial identification step, wherein the viewer is identified using the identifying means 350 and the result is cached for the duration of a work session. Each transition S1, S5 into the active mode A, whether from the ready mode R or the idle mode I, will then be replaced by a transition into the personalized sub-mode associated with the identified viewer, in accordance with the cached identification result. Similarly, each transition S2, S6, S7 from a personalized sub-mode into either the ready mode R or the idle mode I may be carried out substantially as if it happened from the active mode A.

Optionally, the personal profiles may be further refined into sub-profiles A.1.a, A.1.b reflecting different viewing conditions, e.g., wearing of eyeglasses, as described above. Each actual viewing can be observed optically. By using for instance the presence detector 340 or the camera 321, the actual viewing condition may be continuously monitored for a change in sub-profile, allowing the settings in the active sub-mode to be adjusted accordingly.

The algorithms illustrated by FIGS. 1 and 2 may be embodied as computer-executable instructions distributed and used in the form of a computer-program product including a computer-readable medium storing such instructions. By way of example, computer-readable media may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media typically embodies computer readable instructions, data structures, program modules or other data in a modulated data signal such as a carrier wave or other transport mechanism and includes any information delivery media.

The invention claimed is:

1. An imaging device adapted to provide data measurements by imaging at least one eye of a viewer, wherein:
the data measurements describe one or more of eye position or eye orientation;
the imaging device is switchable between at least an active mode and a ready mode;
the imaging device is configured, in the active mode, to maintain a first result history of the data measurements based on data gathered based on first criteria, the first criteria including a first frame rate;
the imaging device is configured, in the ready mode, to maintain a second result history of the data measurements based on data gathered based on second criteria, the second criteria including a second frame rate that is lower than the first frame rate; and
upon switching to the active mode from the ready mode, the imaging device provides additional data based on a combination of the data measurements from the first result history and the data measurements from the second result history.

2. The imaging device of claim 1, wherein the first criteria further include one or more of:
data estimating camera-to-eye distance,
data indicating multiple distinct tracked eye features,
camera data having a resolution reduced by a relatively low binning ratio,
data received from multiple cameras, or
a particular eye position and a particular eye orientation.

3. The imaging device of claim 2, wherein the first criteria further include camera data having a full resolution.

4. The imaging device of claim 1, wherein the second criteria further include one or more of:
data indicating a single distinct tracked eye feature,
camera data having a resolution reduced by a relatively high binning ratio,
data received from a single camera, or
a particular eye position without a particular eye orientation.

5. The imaging device of claim 1, wherein the second result history includes data measurements based on partially processed data.

6. The imaging device of claim 1, wherein, in the ready mode, the data gathered based on the second criteria relates to an eye location in an image plane but not in world coordinates.

7. The imaging device of claim 1, wherein the imaging device is configured to activate, from a group of light sources:
in the active mode, multiple light sources from the group of light sources, and
in the ready mode, a single light source from the group of light sources.

8. The imaging device of claim 1, wherein the imaging device is configured to pre-process optical data by binning at a higher binning ratio in the ready mode than in the active mode.

9. The imaging device of claim 1, wherein the imaging device is switchable between the active mode, the ready mode and an idle mode, and wherein a switching time from the idle mode to the active mode is longer than a switching time from the ready mode to the active mode.

10. A personal computer system comprising:
the imaging device of claim 1;
a visual display; and
an input device for accepting eye-tracking control data and other input data.

11. The personal computer system of claim 10, wherein the input device includes:
at least one dedicated input device adapted to accept the eye-tracking control data only; and
at least one general-purpose input device adapted to accept the other input data.

12. The personal computer system of claim 11, wherein the imaging device operates in the active mode based on an input received from the dedicated input device.

13. The personal computer system of claim 12, wherein the imaging device changes operation to the active mode based on an interrupt triggered by the input received from the dedicated input device.

14. The personal computer system of claim 11, wherein the dedicated input device is a hardware touch-actuated input device, and the imaging device operates in an idle mode based on an input received from the hardware touch-actuated input device.

15. The personal computer system of claim 14, wherein:
the imaging device is selectively connected to a drive power; and
the imaging device changes operation to the idle mode based on the input received from the hardware touch-actuated input device disconnecting the imaging device from said drive power.

16. The personal computer system of claim 10, further comprising a viewer presence detector configured to provide at least one of:
a positive detection signal, wherein the imaging device switches into the ready mode from an idle mode based on the positive detection signal, or
a negative detection signal, wherein the imaging device switches into the idle mode from either the active mode or the ready mode based on the negative detection signal.

17. The personal computer system of claim 16, wherein:
the viewer presence detector is a proximity sensor at a push button and is arranged to sense proximity of a finger; and
the proximity sensor is configured to provide the positive detection signal causing the image device to switch into the ready mode from the idle mode.

18. A method in an imaging device adapted to provide data measurements by imaging at least one eye of a viewer, wherein the data measurements describe one or more of eye position or eye orientation;

wherein said method comprises the steps of:
switching the imaging device between at least an active mode and a ready mode;
in the active mode, maintaining a first result history of the data measurements based on data gathered based on first criteria, the first criteria including a first frame rate; and
in the ready mode, maintaining a second result history of the data measurements based on data gathered based on second criteria, the second criteria including a second frame rate that is lower than the first frame rate; and
upon switching to the active mode from the ready mode, providing additional data based on a combination of the data measurements from the first result history and the data measurements from the second result history.

19. The method of claim 18, wherein the first criteria further include one or more of:
data estimating camera-to-eye distance,
data indicating multiple distinct tracked eye features,
camera data having a resolution reduced by a relatively low binning ratio,
data received from multiple cameras,
the imaging device being configured to use multiple light sources, or
a particular eye position and a particular eye orientation; and
wherein the second criteria further include one or more of:
data indicating a single distinct tracked eye feature,
camera data having a resolution reduced by a relatively high binning ratio,
data received from a single camera,
the imaging device being configured to use a single light source,
data measurements based on partially processed data, or
the particular eye position without the particular eye orientation.

20. A computer program product embodied in a non-transitory computer readable medium, the computer program product comprising computer-executable instructions for executing the method of claim 18.

21. A method in a personal computer system, the personal computer system comprising:
a visual display;
an imaging device adapted to provide data measurements by imaging at least one eye of a viewer of the visual display, wherein the data measurements describe one or more of eye position or eye orientation; and
an input device for accepting eye-tracking control data and other input data,
said method comprising the steps of:
switching the imaging device between at least an active mode and a ready mode;
in the active mode, maintaining a first result history of the data measurements based on data gathered based on first criteria, the first criteria including a first frame rate; and
in the ready mode, maintaining a second result history of the data measurements based on data gathered based on second criteria, the second criteria including a second frame rate that is lower than the first frame rate; and
upon switching to the active mode from the ready mode, providing additional data based on a combination of the data measurements from the first result history and the data measurements from the second result history.

22. The method of claim 21, wherein the first criteria further include one or more of:
data estimating camera-to-eye distance,
data indicating multiple distinct tracked eye features,
camera data having a resolution reduced by a relatively low binning ratio,
data received from multiple cameras, or
the imaging device being configured to use multiple light sources, or
a particular eye position and a particular eye orientation.

23. The method of claim 21, wherein the second criteria further include one or more of:
data indicating a single distinct tracked eye feature,
camera data having a resolution reduced by a relatively high binning ratio,
data received from a single camera,
the imaging device being configured to use a single light source, or
data measurements based on partially processed data, or
a particular eye position without a particular eye orientation.

24. A computer program product embodied in a non-transitory computer readable medium, the computer program product comprising computer-executable instructions of executing the method of claim 21.

* * * * *